US011004642B2

(12) United States Patent
Boete

(10) Patent No.: US 11,004,642 B2
(45) Date of Patent: May 11, 2021

(54) SWITCHING DEVICE OF A STARTING DEVICE FOR AN ENGINE

(71) Applicant: VOLVO TRUCK CORPORATION, Gothenburg (SE)

(72) Inventor: Yann Boete, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/616,696

(22) PCT Filed: Jun. 26, 2017

(86) PCT No.: PCT/IB2017/000930
§ 371 (c)(1),
(2) Date: Nov. 25, 2019

(87) PCT Pub. No.: WO2019/002900
PCT Pub. Date: Jan. 3, 2019

(65) Prior Publication Data
US 2020/0111632 A1    Apr. 9, 2020

(51) Int. Cl.
*H01H 50/44* (2006.01)
*F02N 11/08* (2006.01)
(Continued)

(52) U.S. Cl.
CPC .......... *H01H 50/44* (2013.01); *F02N 11/087* (2013.01); *F02N 15/067* (2013.01); *H01H 50/54* (2013.01);
(Continued)

(58) Field of Classification Search
CPC ...... H01H 50/44; H01H 50/54; H01H 50/643; F02N 11/087; F02N 15/067; H02K 7/20
See application file for complete search history.

(56) References Cited

U.S. PATENT DOCUMENTS 5,909,067 A * 6/1999 Liadakis .............. H01H 51/065
310/14
6,378,479 B1 * 4/2002 Nishidate .............. F02N 15/006
123/179.24
(Continued)

FOREIGN PATENT DOCUMENTS

EP     2472546 A1    7/2012
WO  2013061864 A1    5/2013

OTHER PUBLICATIONS

International Search Report and Written Opinion in corresponding International Application No. PCT/IB2017/000930 dated Mar. 28, 2018 (10 pages).

*Primary Examiner* — Viet P Nguyen
(74) *Attorney, Agent, or Firm* — Venable LLP; Jeffri A. Kaminski

(57) ABSTRACT

The invention relates to a switching device (10) of a starting device for an engine, comprising: —two terminals (11, 12) of a supply electrical circuit of a motor; a solenoid device (13) having an axis (14) and comprising: —a solenoid coil (16) wound around said axis (14); —a plunger (17) which is partially housed in the solenoid coil (16) and which includes a core (18) and a contact plate (21); wherein, when electric current passes through the solenoid coil (16), the plunger (17) is caused to move axially from an inactive position to an active position, thereby moving a pinion gear of the motor into engagement with a ring gear of the engine, in which active position the contact plate (21) is in contact with the terminals (11,12) for closing the motor supply circuit; —a relay (30) having an axis and comprising: —a relay coil (36); —a movable member (31) which, when electric current passes through the relay coil (36), is caused to move from an open position in which electric current cannot pass through the solenoid coil (16), to a closed position in which electric current is made to pass through the (Continued)

solenoid coil (16); the solenoid device (13) and the relay (30) having one and the same axis (14).

19 Claims, 4 Drawing Sheets

(51) Int. Cl.
    *F02N 15/06*     (2006.01)
    *H01H 50/54*     (2006.01)
    *H01H 50/64*     (2006.01)
    *H02K 7/20*     (2006.01)

(52) U.S. Cl.
    CPC ............. *H01H 50/643* (2013.01); *H02K 7/20* (2013.01); *F02N 2011/0874* (2013.01)

(56) References Cited

U.S. PATENT DOCUMENTS

| | | | | |
|---|---|---|---|---|
| 2008/0162007 A1* | 7/2008 | Ishii | ................... | F02N 11/087 701/54 |
| 2010/0033276 A1* | 2/2010 | Niimi | ................... | H01H 50/30 335/202 |
| 2010/0050970 A1* | 3/2010 | Okumoto | ............ | F02N 11/0844 123/179.4 |
| 2011/0202263 A1* | 8/2011 | Kawazu | .............. | F02N 11/0848 701/113 |
| 2011/0221210 A1* | 9/2011 | Suzuki | ................... | F02N 11/087 290/38 R |
| 2012/0260770 A1* | 10/2012 | Nawa | ..................... | F02N 11/087 74/7 C |
| 2013/0027157 A1* | 1/2013 | Niimi | ................... | H01H 50/443 335/2 |
| 2014/0041484 A1* | 2/2014 | Park | ....................... | F02N 11/108 74/7 A |
| 2014/0218141 A1* | 8/2014 | Billot | ..................... | F02N 15/067 335/203 |
| 2014/0278020 A1* | 9/2014 | Neet | ...................... | F02N 11/087 701/112 |
| 2014/0311435 A1* | 10/2014 | Hirabayashi | .......... | F02N 15/067 123/179.25 |
| 2014/0311436 A1* | 10/2014 | Hirabayashi | .......... | H01H 51/065 123/179.25 |
| 2015/0096518 A1* | 4/2015 | Creviston | ................ | B60K 6/26 123/179.4 |
| 2015/0211465 A1* | 7/2015 | Bradfield | ............ | F02N 11/0855 123/179.3 |
| 2015/0285203 A1* | 10/2015 | Hirabayashi | ............ | F02N 15/02 123/179.25 |
| 2015/0285204 A1* | 10/2015 | Holguin Pallares | .. | F02N 15/067 290/38 C |
| 2015/0354523 A1* | 12/2015 | Hirabayashi | .......... | F02N 11/087 123/179.3 |
| 2016/0155590 A1* | 6/2016 | Suzuki | ................... | H01H 47/22 361/160 |

* cited by examiner

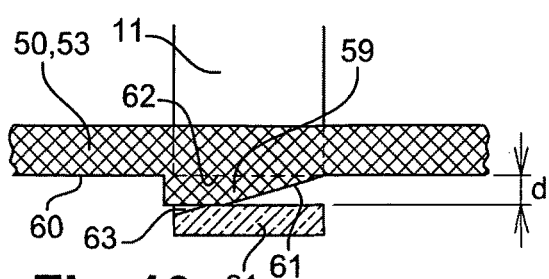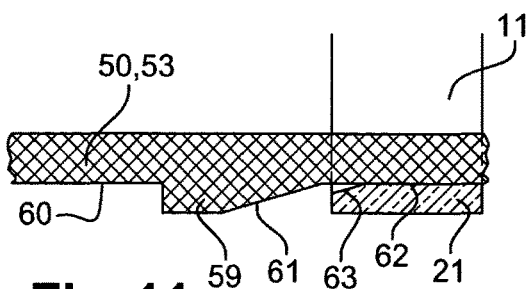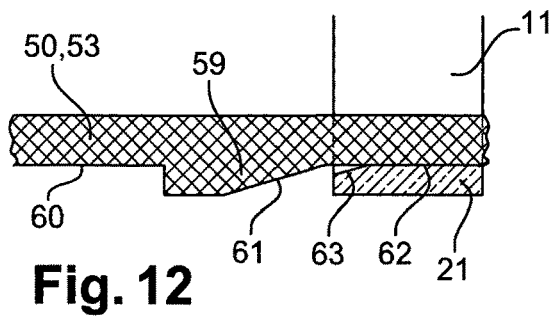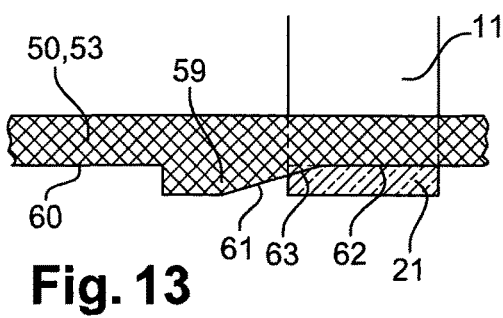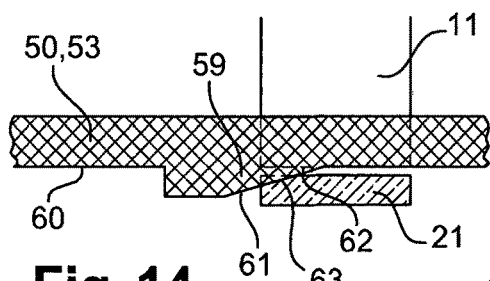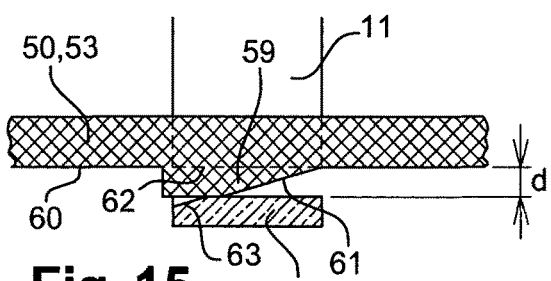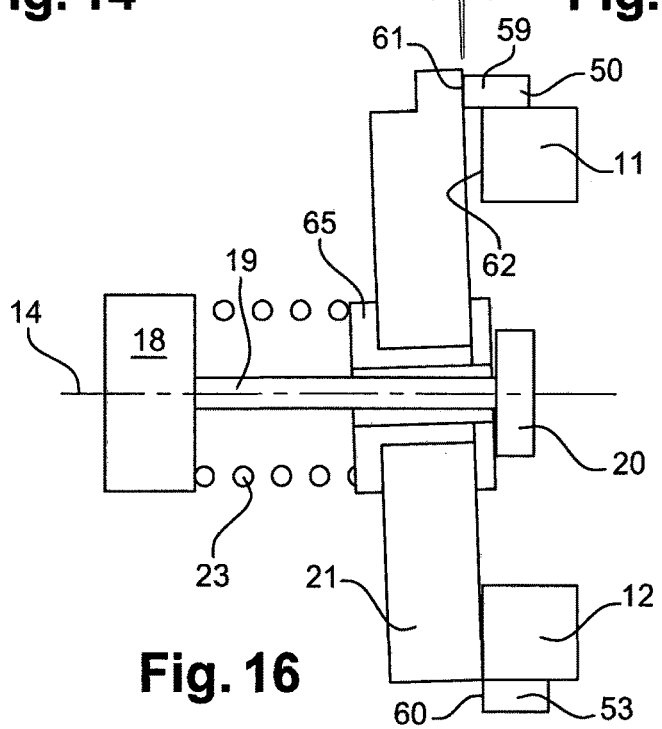

SWITCHING DEVICE OF A STARTING DEVICE FOR AN ENGINE

CROSS-REFERENCE TO RELATED APPLICATIONS

This application is a U.S. National Stage application of PCT/IB2017/000930, filed Jun. 26, 2017 and published on Jan. 3, 2019 as WO/2019/002900, all of which is hereby incorporated by reference in its entirety.

TECHNICAL FIELD

The invention relates to a switching device of a starting device for an engine, a starting device for an engine comprising such a switching device, and an engine arrangement comprising such a starting device.

The invention can be applied in heavy-duty vehicles, such as trucks, buses and construction equipment.

BACKGROUND

A conventional starting device for an engine comprises a motor which is powered by a battery and which includes a pinion gear for engaging a ring gear of the engine, and a switching device.

The switching device comprises a solenoid device including at least one coil and a plunger which is housed in the coil and can move axially, when electric current passes through the coil, to cause the pinion gear engage the engine ring gear and power to be supplied to the motor. The switching device further comprises a relay for controlling the operation of the solenoid device.

The relay is generally fastened onto the starting device, thus forming a member protruding radially at the periphery of the starting device. Such an arrangement has many drawbacks.

One main problem is that such an arrangement requires space at the periphery of the starting device, which may not be available in many engine arrangements. This results in a sub-optimal relay installation and may impede access to some components of the engine arrangement.

Furthermore, with this arrangement, the lead wires required between the relay, the solenoid device and the battery are exposed to external constraints and can be damaged by corrosion or mechanical wear.

It therefore appears that, from several standpoints, there is room for improvement in starting devices.

SUMMARY

An object of the invention is to provide a switching device of a starting device for an engine which solves at least part of the problems of the prior art, in terms of packaging and service life.

For that purpose, according to a first aspect, the invention relates to a switching device of a starting device for an engine, comprising:
  two terminals of a supply electrical circuit of a motor;
  a solenoid device having an axis, the solenoid device comprising:
    a solenoid coil wound around said axis;
    a plunger which is partially housed in the solenoid coil and which includes a core and a contact plate;
  wherein, when electric current passes through the solenoid coil, the plunger is caused to move axially from an inactive position to an active position, thereby moving a pinion gear of the motor into engagement with a ring gear of the engine, in which active position the contact plate is in contact with the terminals for closing the motor supply electrical circuit;
  a relay having an axis, the relay comprising:
    a relay coil;
    a movable member which, when electric current passes through the relay coil, is caused to move from an open position in which electric current cannot pass through the solenoid coil, to a closed position in which electric current is made to pass through the solenoid coil;
  the solenoid device and the relay having one and the same axis.

Owing to such a coaxial arrangement of the solenoid device and of the relay, the invention greatly improves the starting device packaging, no outside piece being provided at the periphery of the starting device. Besides, it makes it possible to create an integrated system, without externally located lead wires, thereby significantly increasing the starting device reliability.

In an embodiment, the relay can be arranged between the core and the contact plate, outside the solenoid coil.

According to an embodiment, the movable member of the relay is configured to rotate about said axis between the open position and the closed position. Arranging the relay coaxially and in a rotatable manner relative to the solenoid device is very efficient from a magnetic perspective, therefore leading to high performances. It also further improves the starting device compactness.

For example, the relay can be configured so that the rotation range of the movable member between the open position and the closed position is comprised between 30° and 60°, for example around 45°.

The relay may comprise biasing means for biasing the movable member towards its open position.

The relay may further comprise:
  a switch which is urged towards an open position and which can be moved to a closed position in which it closes a supply circuit of the solenoid device, so that an electric current can pass through the solenoid coil;
  an actuator rotatably fastened to the movable member, and configured to move the switch towards its closed position when the movable member moves towards its closed position.

According to an embodiment, the relay comprises a stator having at least one pole. For example, the stator is substantially C shaped, the stator having one pole at each of its ends, the poles substantially facing each other along a radial direction, the relay coil being wound around the stator. The relay coil can be wound around a central portion of stator.

The relay may further comprise a rotor as the movable member the rotor having at least one pole and being rotatably mounted around said axis, for example between the stator poles.

The plunger can comprise a shaft having a first end which is fastened to the core or which can be axially moved by the core, and an end stop fastened to the second end of the shaft, opposite the core, the contact plate comprising a central hole into which the shaft is engaged, the switching device further comprising biasing means configured to urge the contact plate towards the end stop.

For example, the movable member can comprise a central hole into which the shaft is engaged, the movable member therefore being rotatably mounted relative to the shaft, between the core and the contact plate, and the movable member being axially free relative to the shaft.

The contact plate and the plunger can be mutually configured so that the contact plate can pivot about an axis which is orthogonal to the solenoid axis by an angle ranging from 0.5° to 10°, for example around 3°. This disposition makes the separation of the contact plate from the terminals easier. To that end, for example, the diameter of the contact plate central hole can be slightly greater than the shaft diameter.

According to an embodiment, the switching device further comprises a safety device which can be in a safety position, in which it prevents the contact plate from coming into contact with the terminals, and which is caused to move towards a connection position when the movable member of the relay is moved towards its closed position, in which connection position the safety device allows the contact plate to be in contact with the terminals.

The safety device allows preventing the contact plate from coming into contact with the terminals when the solenoid coil is not energized, thus increasing safety. Then, when the movable member moves back to its open position, the safety device is made to move back to its safety position, thereby forcing the contact plate to separate from the terminals.

In an embodiment, the terminals can have a contact face which extends substantially in a plane orthogonal to the axis, and which is directed towards the contact plate, and the safety device can comprise:
  a substantially radial face arranged substantially level with the terminals contact face;
  and a projection which extends from said radial face towards the contact plate, said projection being configured such that:
    in the safety position, it is arranged substantially axially in line with one terminal, and it extends farther towards the contact plate relative to the terminals contact face;
    in the connection position, it is offset relative to said terminal.

The projection can have a sloped face and, preferably, the contact plate can have a corresponding chamfer. This makes the separation of the contact plate away from the terminals easier.

The safety device can have at least one driven member which cooperates with an operating member of the movable member, so that the movable member rotation causes the safety device rotation around the axis.

For example, the movable member has at least one radial protrusion as the operating member, and the safety device comprises an annular collar provided with at least one radial notch or opening as the driven member, the collar being mounted around the movable member with the radial protrusion received in the radial notch or opening.

The actuator can be arranged on the safety device, for example on the annular collar.

The safety device may comprise a ring arranged around the terminals, an annular collar arranged around the movable member, and peripheral walls which extend axially and which link said ring and said annular collar, the projection being arranged on the ring.

According to a second aspect, the invention relates to a starting device for an engine, comprising a motor having an output shaft including a pinion gear, and further comprising a switching device as previously described, wherein the plunger of the solenoid device is inked to the output shaft of the motor by a lever, so that an axial movement of the plunger causes an axial movement of the output shaft, and wherein the motor is connected to one of the terminals.

According to a third aspect, the invention relates to an engine arrangement comprising a starting device as previously described, and further comprising:
  an engine including a ring gear with which the pinion gear of the motor can come into engagement;
  a battery connected to the terminal which is not connected to the motor, and capable of supplying power to the solenoid coil and the relay coil;
  an electrical control unit for controlling the power supply of the relay coil.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 10 and 11 are detailed views of the safety device and contact plate of the switching device, and show steps for closing the motor supply electrical circuit;

FIG. 12-15 are detailed views of the safety device and contact plate of the switching device, and show steps for opening the motor supply electrical circuit;

FIG. 16 is a detailed view of the switching device near the contact plate.

DETAILED DESCRIPTION OF EXAMPLE EMBODIMENTS OF THE INVENTION

Figure 1:
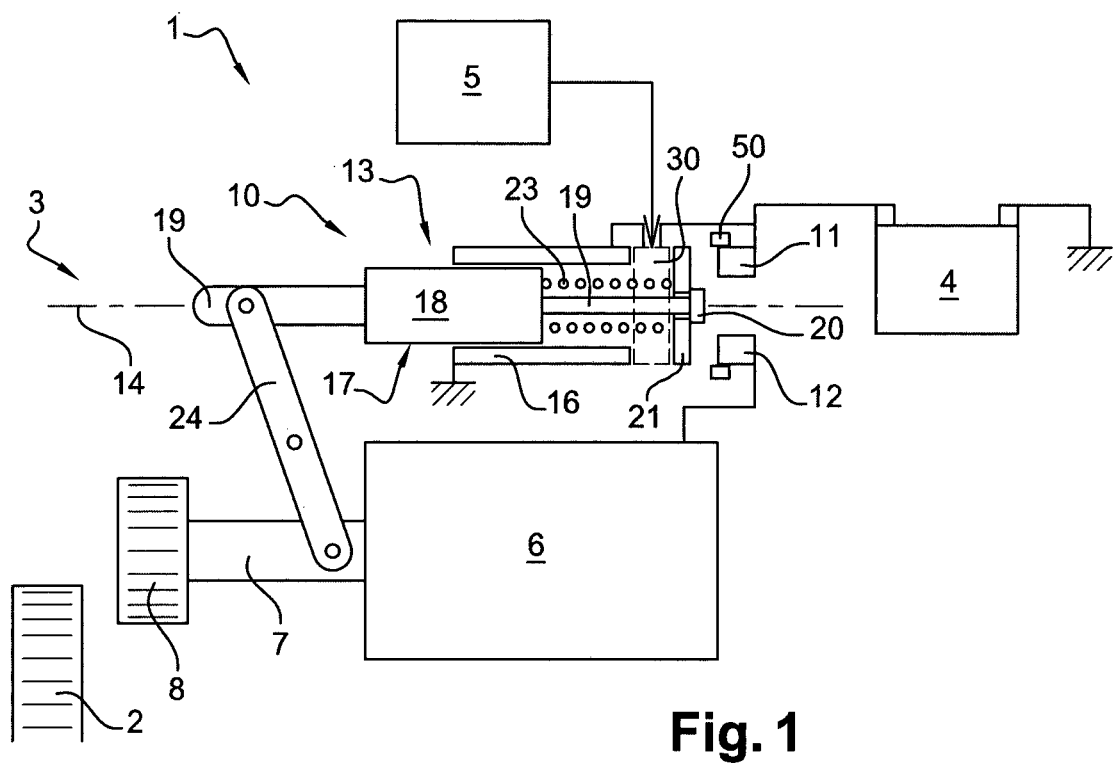
FIG. 1 is a schematic illustration of an engine arrangement comprising a starting device including a switching device, according to an embodiment of the invention.

An engine arrangement 1 is partially illustrated in FIG. 1. The engine arrangement 1 comprises an engine (not shown) including a ring gear 2, a starting device 3 for starting the engine, a battery 4 and an electrical control unit 5.

The starting device 3 comprises a motor 6 having an output shaft 7 including a pinion gear 8 which can mesh with the engine ring gear 2, in an engine starting phase. The starting device 3 also comprises a switching device 10 which allows starting the motor 6 and coupling the motor 6 to the engine so as to start said engine.

The switching device 10 comprises terminals of a supply electrical circuit of the motor 6, namely a first terminal 11 connected to the battery and a second terminal 12 connected to the motor 6.

The switching device 10 also comprises a solenoid device 13 having an axis 14. The solenoid device 13 comprises a solenoid coil 16 wound around said axis 14, as well as a plunger 17 which is partially housed in the solenoid coil 16. The plunger 17 includes a core 18, a shaft 19 fastened to the core 18 and an end stop 20 fastened to the shaft 19 opposite the core 18. It is specified that the solenoid coil 16 can comprise several coils such as a solenoid hold coil, a solenoid push coil, and possibly a solenoid shunt coil.

Alternatively, the end stop 20 could be fastened to a shaft 19 separate from the core 18 by a small distance. In such an arrangement, an axial movement of the core towards the terminals causes the same axial movement of the shaft and end stop only after the core has moved by said distance and thus has come into contact with the shaft. The invention also applies to such an alternative arrangement although it is not specifically illustrated.

The plunger further includes a contact plate 21 which has a central hole 22 into which the shaft 19 is engaged, the contact plate 21 being located between the core 18 and the end stop 20. The contact plate 21 can be made of copper or contain copper. Biasing means, such as a helical spring 23 mounted around the shaft 19 between the core 18 and the contact plate 21, are provided to urge the contact plate 21 towards the end stop 20.

Besides, the plunger 17 of the solenoid device 10 is linked to the output shaft 7 of the motor 6 by a lever 24.

Thus, when an electric current provided by the battery 4 passes through the solenoid coil 16, the plunger 17 is caused to move axially from an inactive position (shown in FIG. 1) to an active position (i.e. towards the right on FIG. 1). Such a movement results in:
- an axial movement of the motor output shaft 7, by means of the lever 24, to bring the pinion gear 8 of the motor 6 into engagement with the engine ring gear 2;
- an axial movement of the contact plate 21 towards the terminals 11, 12, until the active position in which the contact plate 21 is in contact with the terminals 11, 12, thereby closing the motor supply electrical circuit.

The switching device 10 further comprises a relay 30. According to the invention, the relay 30 is arranged coaxially with the solenoid device 13, i.e. has the same axis 14.

The relay 30 is located axially between the solenoid coil 16 and the contact plate 21, and is arranged around the shaft 19 of the plunger 17.

In the illustrated exemplary embodiment, the relay 30 comprises a rotor 31 having a central hole 32 into which the shaft 19, is engaged in such a way that the rotor 31 is rotatably mounted relative to the shaft 19, and axially free relative to the shaft 19. The rotor 31 can also comprise at least one radial protrusion 33, for example two diametrically opposed radial protrusions 33. Each protrusion 33 form one pole of the rotor 31.

The relay 30 further comprises a stator 34 which can be substantially C shaped. The stator 34 has one pole 35 at each of its ends, the poles substantially facing each other along a radial direction. Moreover, the relay comprises a relay coil 36 which is wound around the stator 34, substantially in a central portion thereof, i.e. between the poles 35. The rotor 31 is arranged between the stator poles 35.

The switching device 10 also comprises a housing 25 which receives the solenoid device 13, the relay 30 and the terminals 11, 12. The rotor 31 is rotatably mounted on the housing 25. On one of its axial ends, the housing 25 has one opening (not shown) for allowing the end of shaft 19 opposite the end stop 20 to pass through it. Moreover, on its other axial end, the housing 25 has two openings 26, 27 in which the terminals 11, 12, respectively, are engaged, so that part of these terminals 11, 12 is located around the housing 25 to allow connection to the battery 4 and the motor 6.

Figure 3:
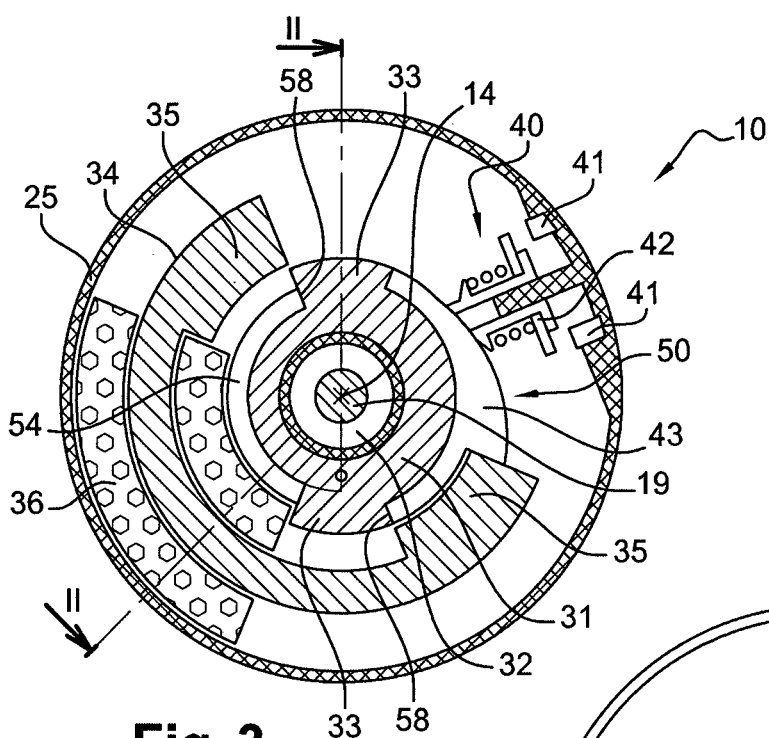
FIG. 3 is a sectional view of the switching device, according to line III-Ill of FIG. 2, the movable member of the switching device being in an open position.
Figure 4:
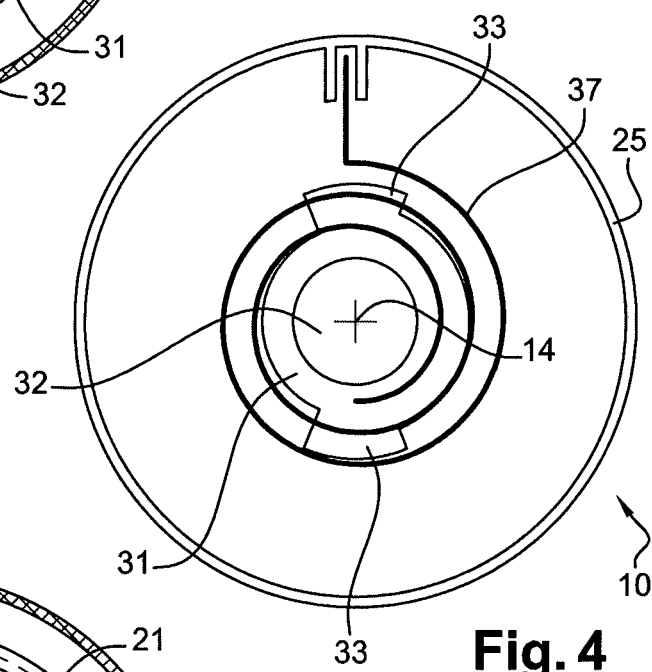
FIG. 4 is a sectional view of the switching device, according to line IV-IV of FIG. 2.
Figure 5:
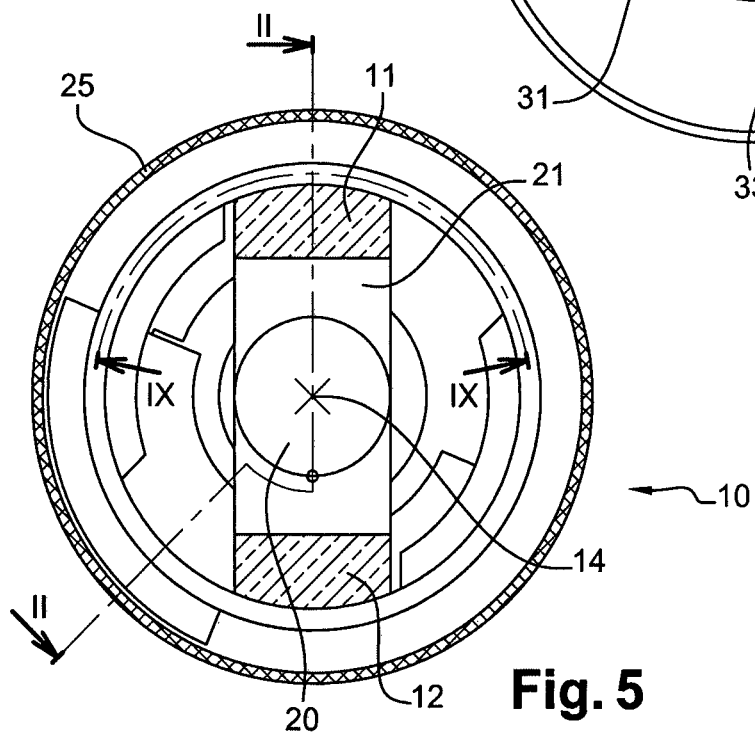
FIG. 5 is a sectional view of the switching device, according to line V-V of FIG. 2.

When no electric current passes through the relay coil 36, the rotor 31 is in an open position, as shown on FIG. 3, the protrusions 33 of the rotor 31 being circumferentially offset from the stator poles 35. The rotor 31 is biased towards its open position by biasing means, such as a flat spiral spring 37 having one end fastened to the housing 25 and one end fastened to the rotor 31 (see FIG. 4).

Upon appropriate command of the electrical control unit 5, the battery 4 supplies electric current to the relay coil 36. As a consequence, the rotor 31 is caused to rotate around axis 14 from its open position to a closed position in which each of the protrusions 33 substantially faces one pole 35 of the stator 34 (see FIG. 8). Such an arrangement provides a closed magnetic field, which is particularly advantageous in terms of efficiency.

It can be provided that the rotation range of the rotor 31 between the open position and the closed position is comprised between 30° and 60°, for example around 45°.

As shown on FIG. 3, the relay 30 further comprises a switch 40. The switch 40 comprises terminals 41 secured to the housing 25, and a mobile component 42 which is slidably guided relative to the housing 25 and which is kept away from the terminals 41 by biasing means, towards an open position.

Figure 8:
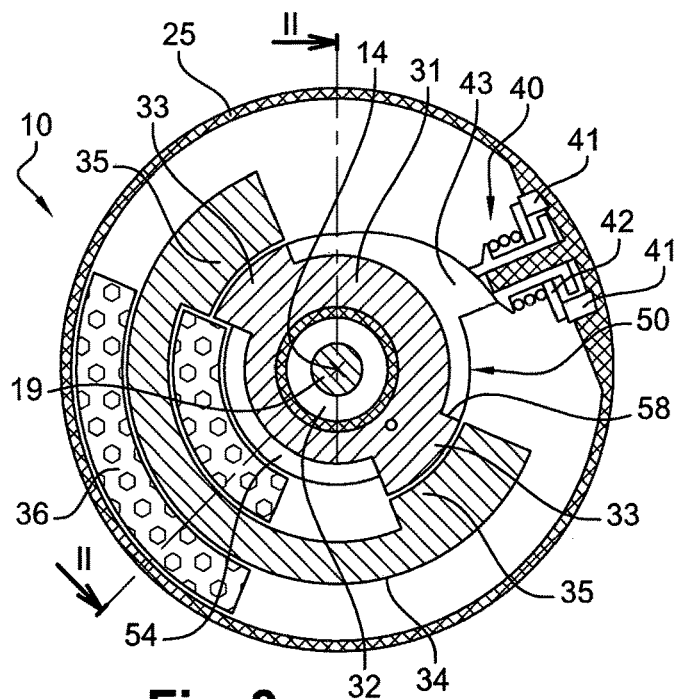
FIG. 8 is a view similar to FIG. 3, the movable member of the switching device being in an closed position.

The relay 30 also comprises an actuator 43 which is rotatably fastened to the rotor 31. Thus, when the rotor 31 rotates about axis 14 towards its closed position, the actuator 43 is caused to rotate to a closed position thereby moving the switch 40 towards its closed position (FIG. 8). Thus, the switch 40 closes a supply circuit of the solenoid device 13, so that an electric current supplied by the battery 4 can pass through the solenoid coil 16. In practice, the actuator 43 can be a component having a growing diameter in a circumferential direction corresponding to the closing movement.

In other words, activation of the relay 30 causes activation of the solenoid device 13, which entails starting of the motor 6 and engagement between the pinion gear 8 and the engine ring gear 2, resulting in the engine being started.

The actuator 43 can be part of a piece separate from the rotor 31. In an embodiment, said piece further forms a safety device 50 which prevents the contact plate 21 from coming into contact with the terminals 11, 12 when the rotor 31 is not in its closed position.

More specifically, the safety device 50 can be in a safety position, in which it prevents the contact plate 21 from coming into contact with the terminals 11, 12, and can be caused to move towards a connection position when the rotor 31 is moved towards its closed position. In said connection position, the safety device 50 allows the contact plate 21 to be in contact with the terminals 11, 12, i.e. allows powering the motor 6 and starting the engine.

Figure 6:
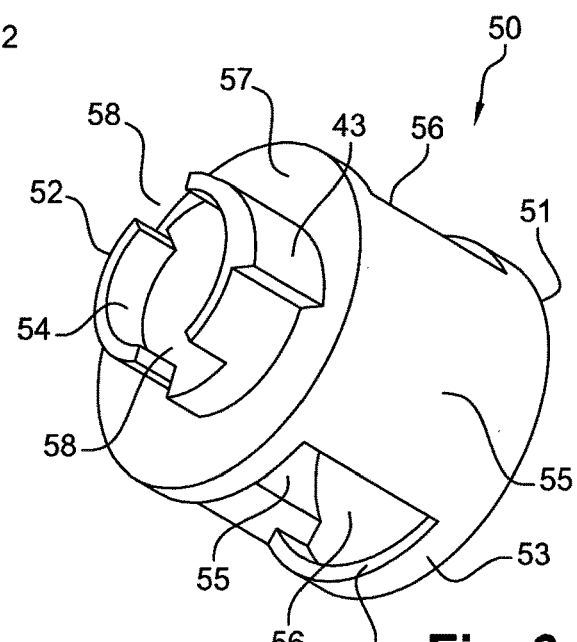

An embodiment of the safety device 50 will now be described, with reference to FIGS. 6 and 7.

The safety device 50 is substantially cylindrical and mounted coaxially with axis 14, between the relay 30 and the terminals 11, 12. It has a first axial end 51, on the side of the terminals 11, 12, and a second axial end 52, on the side of the relay 30.

On its first end 51, the safety device 50 comprises a ring 53 arranged around the terminals 11, 12 (see FIG. 2); on its second end 52, the safety device 50 comprises an annular collar 54 arranged around the rotor 31 (see FIG. 3). The ring 53 and annular collar 54 are linked by two peripheral walls 55 which extend axially and face each other. Two facing windows 56 are arranged between the peripheral walls 55. As the diameter of the annular collar 54 is smaller than the diameter of the safety device 50 around the peripheral walls 55, a radial wall 57 is arranged between the peripheral walls 55 and the annular collar 54.

The annular collar 54 is provided with openings 58 (or alternatively notches), the location and dimensions of which are adapted to the rotor protrusions 33, so that said protrusions 33 can fit into said openings 58, as shown on FIG. 3. Besides, the safety device 50 includes the actuator 43, as a component protruding radially from the annular collar 54.

The safety device 50 is preferably made of a material which is non-magnetic, in order not to disturb the operation of the rotor 31, and non-conducting, in order not to create a short circuit with the terminals 41. For example, the safety device 50 can be made of a plastic material.

Figure 7:
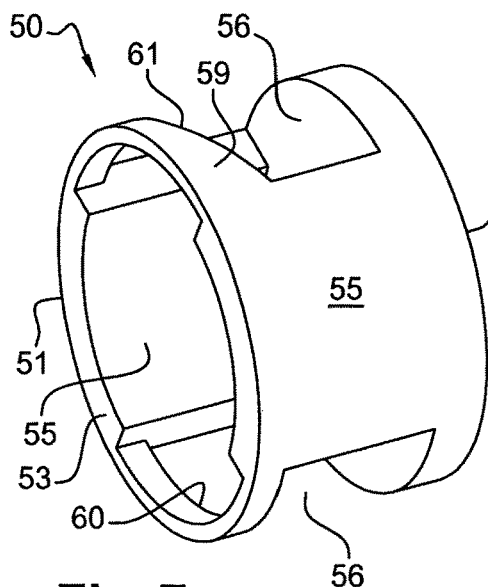
FIGS. 6 and 7 are perspective view of a safety device included in the switching device.

As can be seen on FIG. 7, the safety device 50 further comprises a projection 59 which is arranged between the ring 53 and one of the peripheral walls 55. The projection 59 extends from the radial face 60 of the ring 53 which faces the annular collar 54, towards the annular collar 54, and has a sloped face 61.

Figure 2:
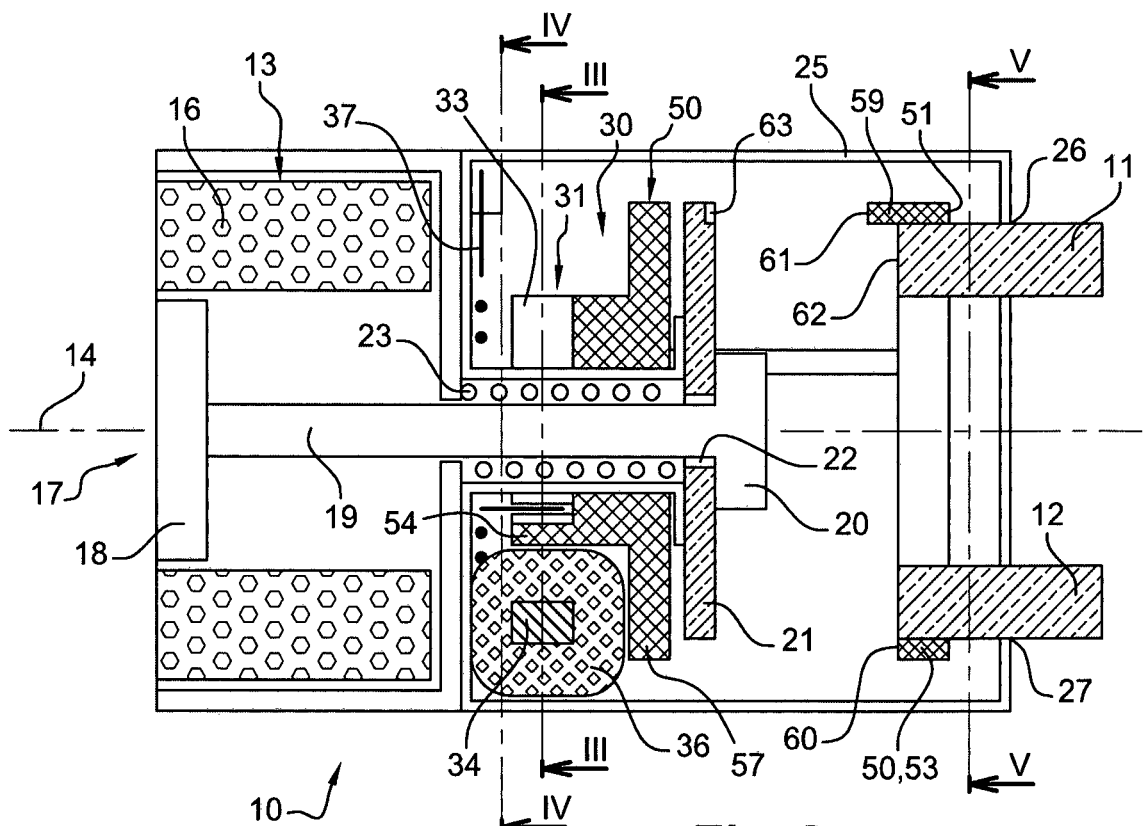
FIG. 2 is a detailed sectional view of the switching device, according to line II-II of FIG. 5.
Figure 9:
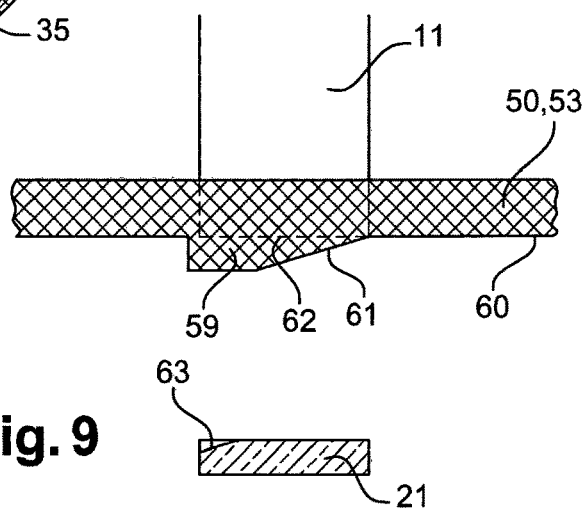
FIG. 9 is a sectional view of the switching device, according to line IX-IX of FIG. 5.

As illustrated on FIGS. 2 and 9, when mounted in the switching device 10, the safety device 50 is arranged such that the radial face 60 of the ring 53 is substantially level with the terminals contact face 62 of the terminals 11, 12, i.e. the face which extends substantially in a plane orthogonal to the axis 14 and which is directed towards the contact plate 21. As a consequence, the projection 59 extends from said radial face 60 of the ring 53. In other words, the projection 59 extends farther towards the contact plate 21 relative to the terminals contact face 62.

The operation of the switching device 10 equipped with the safety device 50 will now be described.

In the position of FIG. 3, when no electric current passes through the relay coil 36, the rotor 31 and the switch 40 are in their open positions, and the safety device 50 is in its safety position, i.e. is positioned such that the projection 59 is substantially axially in line with one terminal 11, as shown on FIG. 9.

When an electric current passes through the relay coil 36, the rotor 31 rotates around axis 14 towards its closed position, as previously explained. Owing to the cooperation between the protrusions 33 of the rotor and the openings 58 of the safety device 50 which receive the protrusions 33, the safety device 50 is made to rotate about axis 14. As a consequence, the projection 59 is moved circumferentially with respect to the terminal 11, until a connection position (shown on FIG. 11) in which the projection 59 is offset relative to said terminal 11.

It is specified that, in the illustrated embodiment, the protrusions 33 have both an electrical function, as they are the rotor poles, and a mechanical function, as they cause the rotating movement of the safety device 50. Alternatively, these two functions could be achieved by two separate means. For example, there could be provided an additional member for rotating the safety device which would be separate from the poles. Or the safety device could be secured to the rotor by gluing or any other appropriate method.

When the solenoid coil 16 is supplied with electric current, the contact plate 21 is moved towards the terminals 11, 12. But as long as the safety device 50 has not been turned enough, the projection 59 prevents the contact between the contact plate 21 and the terminals 11, 12 by forming an abutment for the contact plate at a safety distance d from the terminals contact face 60, as illustrated on FIG. 10. When the safety device 50 has reached its connection position, because the projection 59 is offset relative to the terminal 11, the contact plate 21 can be in contact with the terminals contact face 60 (FIG. 11).

Reversely, FIGS. 12 to 15 show the relative positions of the contact plate 21, the projection 59 and the terminal 11 when the motor supply electrical circuit is being opened.

From the connection position of FIG. 12 (identical to FIG. 11), when the rotor 31 is rotated back to its open position, the safety device 50 is caused to rotate in the same way towards its safety position. This results in the projection 59 moving back to a position in which it is axially in line with the corresponding terminal (here terminal 11), while the contact plate 21 is initially in contact with the terminal contact face 60.

When the projection 59 comes into contact with the contact plate 21, it pushes said contact plate 21 axially away from the terminal contact face 60. This separation movement can be facilitated by the sloped face 61, and preferably by the provision on the contact plate 21 of a corresponding chamfer 63, or analogous.

This separation movement can also be facilitated by a further disposition shown in FIG. 16. The diameter of the contact plate central hole 22 can be slightly greater than the diameter of the shaft 19. In the illustrated embodiment, an additional component 65 is engaged inside the central hole 22, around the shaft 19, which is only a possible Implementation. Because of this difference in diameter, the contact plate 21 can pivot about an axis which is orthogonal to the solenoid axis 14 by an angle α ranging from 0.5° to 3°. Thus, when the single projection 59 begins locally pushing the contact plate 21 away from the terminal 11, this entails the slight pivoting movement of the contact plate 21 shown in FIG. 16. As a result, the contact plate 21 is then in contact with only one of the two terminals, which makes the complete separation of the contact plate 21 from the terminals 11, 12 easier.

It is to be understood that the present invention is not limited to the embodiments described above and illustrated in the drawings; rather, the skilled person will recognize that many changes and modifications may be made within the scope of the appended claims.

Although the above detailed description is made for a switching device including a stator and a rotor, other embodiments are possible with another type of movable member, provided this movable member operates as follows: when electric current passes through the relay coil, the movable member is caused to move from an open position in which electric current cannot pass through the solenoid coil, to a closed position in which electric current is made to pass through the solenoid coil. The movable member may be configured to rotate about said axis between the open position and the closed position, but other types of movements can be envisaged.

The invention claimed is:

1. A switching device of a starting device engine, comprising: two terminals of a supply electrical circuit of a motor; a solenoid device having an axis, the solenoid device comprising: a solenoid coil wound around said axis; a plunger which is partially housed in the solenoid coil and which includes a core and a contact plate; wherein, when electric current passes through the solenoid coil, the plunger is caused to move axially from an inactive position to an active position, thereby moving a pinion gear of the motor into engagement with a ring gear of the engine, in which active position the contact plate is in contact with the terminals for closing the motor supply electrical circuit; a relay having an axis, the relay comprising: a relay coil; a movable member which, when electric current passes through the relay coil, is caused to move from an open position in which electric current cannot pass through the solenoid coil, to a closed position in which electric current is made to pass through the solenoid coil; the solenoid device and the relay having one and the same axis, and the movable member of the relay is configured to rotate about said axis between the open position and the closed position.

2. The switching device according to claim 1, wherein the relay is configured so that the rotation range of the movable member between the open position and the closed position is comprised between 30° and 60°.

3. The switching device according to claim 1, wherein the relay comprises biasing means for biasing the movable member towards its open position.

4. The switching device according to claim 1, wherein the relay further comprises: a switch which is urged towards an open position and which is moved to a closed position in which it closes a supply circuit of the solenoid device, so that an electric current can pass through the solenoid coil; an actuator rotatably fastened to the movable member, and configured to move the switch towards its closed position when the movable member moves towards its closed position.

5. The switching device according to claim 1, wherein the relay comprises a stator which is substantially C shaped, the stator having one pole at each of its ends, the poles substantially facing each other along a radial direction, the relay coil being wound around the stator.

6. The switching device according to claim 5, wherein the relay further comprises a rotor as the movable member, the rotor having at least one pole and being rotatably mounted around said axis, between the stator poles.

7. The switching device according to claim 1, wherein the plunger comprises a shaft having a first end which is fastened to the core or which is axially moved by the core, and an end stop fastened to the second end of the shaft, opposite the core, the contact plate comprising a central hole into which the shaft is engaged, the switching device further comprising biasing means configured to urge the contact plate towards the end stop.

8. The switching device according to claim 7, wherein the contact plate and the plunger are mutually configured so that the contact plate can pivot about an axis which is orthogonal to the solenoid axis by an angle ($\alpha$) ranging from 0.5° to 10°.

9. The switching device according to claim 1, wherein the movable member comprises a central hole into which a shaft is engaged, the movable member therefore being rotatably mounted relative to the shaft, between the core and the contact plate, and the movable member being axially free relative to the shaft.

10. The switching device according to claim 1, further comprises a safety device having a safety position, in which it prevents the contact plate from coining into contact with the terminals, and which is caused to move towards a connection position when the movable member of the relay is moved towards its closed position, in which connection position the safety device allows the contact plate to be in contact with the terminals.

11. The switching device according to claim 10, wherein the actuator is arranged on the safety device.

12. The switching device according to claim 10, wherein the terminals have a contact face which extends substantially in a plane orthogonal to the axis, and which is directed towards the contact plate, and in that the safety device comprises: a substantially radial face which is arranged substantially level with the terminals contact face or which is located farther from the contact plate than the terminals contact face; and a projection which extends from said radial face towards the contact plate, said projection being configured such that: in the safety position, it is arranged substantially axially in line with one terminal, and it extends farther towards the contact plate relative to the terminals contact face; in the connection position, it is offset relative to said terminal.

13. The switching device according to claim 12, wherein the projection has a sloped face and, the contact plate has a corresponding chamfer.

14. The switching device according to claim 10, wherein the safety device has at least one driven member which cooperates with an operating member of the movable member, so that the movable member rotation causes the safety device rotation around the axis.

15. The switching device according to claim 14, wherein the movable member has at least one radial protrusion as the operating member and in that the safety device comprises an annular collar provided with at least one radial notch or opening as the driven member, the collar being mounted around the movable member with the radial protrusion received in the radial notch or opening.

16. The switching device according to claim 15, wherein the actuator is arranged on the annular collar.

17. The switching device according to claim 10, wherein the safety device comprises a ring arranged around the terminals, an annular collar arranged around the movable member, and peripheral walls which extend axially and which link said ring and said annular collar the projection being arranged on the ring.

18. A starting device for an engine, comprising a motor having an output shaft including a pinion gear, and further comprising a switching device according to claim 1, wherein the plunger of the solenoid device is linked to the output shaft of the motor by a lever so that an axial movement of the plunger causes an axial movement of the output shaft, and wherein the motor is connected to one of the terminals.

19. An engine arrangement comprising a starting device according to claim 18, and further comprising: an engine including a ring gear with which the pinion gear of the motor can come into engagement; a battery connected to the terminal which is not connected to the motor, and capable of supplying power to the solenoid coil and the relay coil; an electrical control unit for controlling the power supply of the relay coil.

* * * * *